Figure 1:
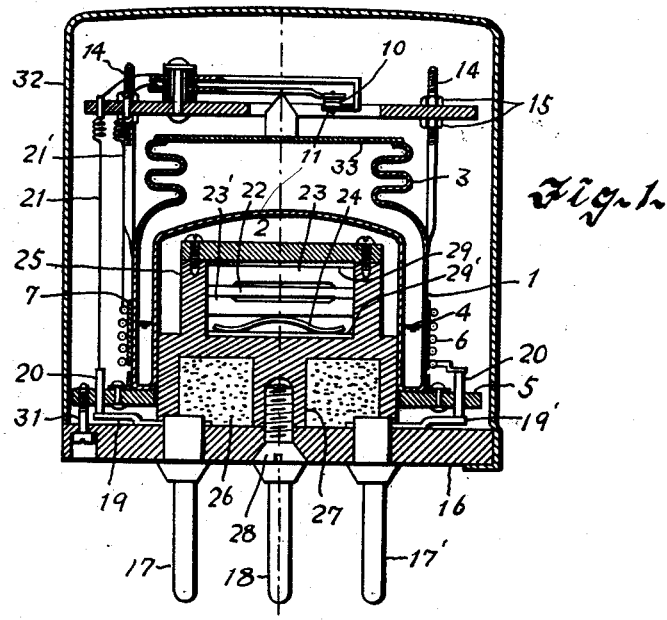

April 20, 1954

KEIGO KOBAYASHI 2,676,274

REMOVABLE TEMPERATURE CONTROLLING DEVICE
FOR PIEZOELECTRIC CRYSTALS

Filed June 10, 1952

2 Sheets-Sheet 1

Inventor.
KEIGO KOBAYASHI
by
Haseltine, Lake & Co.
AGENTS

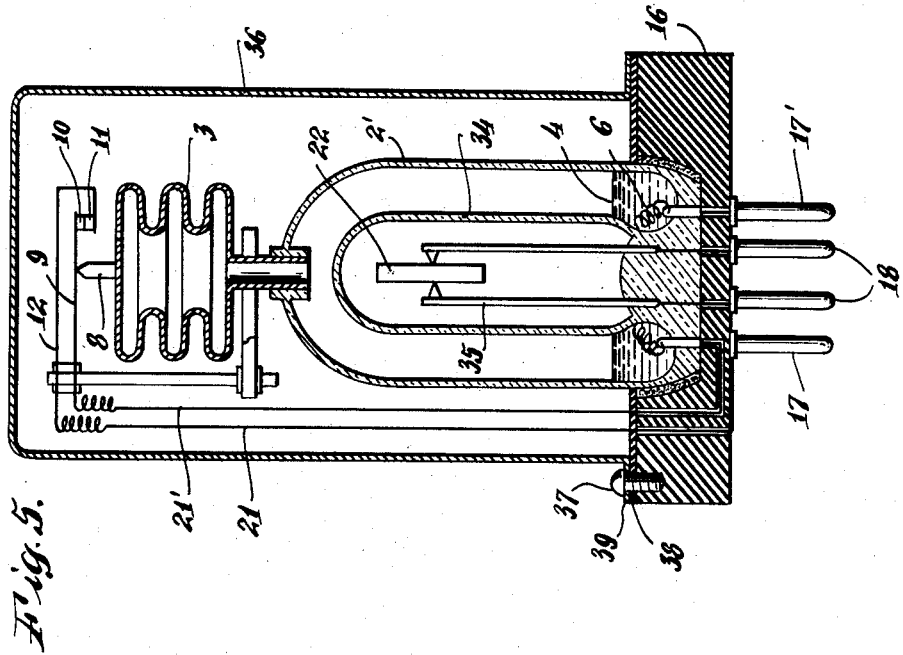
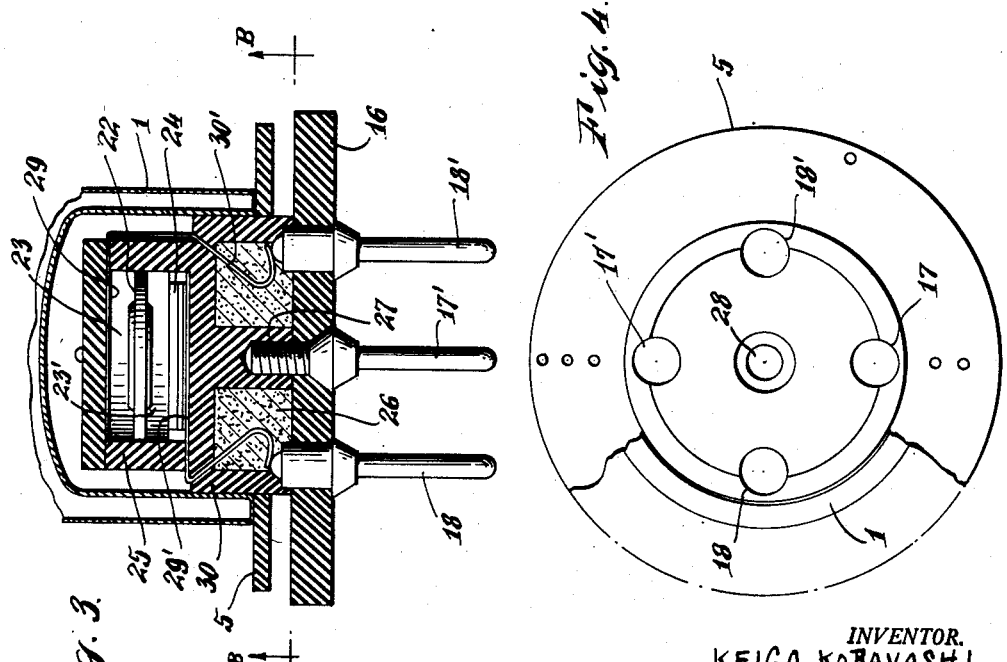

Patented Apr. 20, 1954

2,676,274

UNITED STATES PATENT OFFICE 2,676,274

REMOVABLE TEMPERATURE CONTROLLING DEVICE FOR PIEZOELECTRIC CRYSTALS

Keigo Kobayashi, Mitaka, Tokyo, Japan

Application June 10, 1952, Serial No. 292,626

Claims priority, application Japan June 16, 1951

8 Claims. (Cl. 310—8.9)

This invention relates to thermostats and, more particularly to thermostats having elements to be maintained at any desired constant temperature are enclosed therein.

It is an object of this invention to provide a thermostat which is sensitive and positive in operation.

Another object of this invention is to provide a thermostat which maintains a frequency tuning element, such as a quartz resonator, for wireless transmission, receiving apparatus or the like at an accurately constant temperature.

In a thermostat heretofore known, it is usual to provide a bimetallic element which is arranged to control electric contacts by the displacement of the bimetallic element itself based upon temperature change of a room, which temperature is maintained constant. That is, when the temperature becomes lower than a predetermined value, the displacement of the bimetallic element closes electric contacts to energize an electric heater. If the temperature of the room, on the contrary, raises to the desired value which, in turn, causes the opposite displacement of the bimetallic element resulting in opening of the contacts cutting with the result that the electric current to the heater. Such a thermostat, however, is not so sensitive because of the fact that the bimetallic element has inertia in its displacement with regard to heat. Consequently the temperature of the room is not constantly maintained at the desired value.

In accordance with this invention, a sealed vessel and an elastic bellows forming a part thereof and communicating therewith are provided. Vaporizable liquid, such as ether or alcohol, and its vapor are simultaneously enclosed in the vessel. An electric heater is also provided for heating the liquid in the vessel by a current passing through a pair of electric contacts, which is so arranged as to be opened by the free end of the bellows when it is elongated owing to the pressure increase in the vessel. The sealed vessel forms a chamber in which an object to be maintained at a desired temperature is inserted.

In case of heating, one part of the liquid is vaporized to become gaseous state, the volume of which is much greater as compared with that of the liquid. For instance, methyl-alcohol, the boiling point of which is 64.5° C. at 1 atmospheric pressure has the volume of about 522 times greater than that of its liquid state. Such a great exchange of the volume of the medium will momentarily increase the pressure in the vessel to elongate the bellows positively and a considerable distance. This is the reason why a thermostat according to this invention has the advantages of sensitive and positive operation. Consequently, in accordance with this invention, the elements are enclosed in the vessel itself or in a chamber surrounded by the vessel so as to exactly maintain the temperature of the elements constant.

This invention will be more clearly understood by reference to the attached drawing showing, by way of example, some embodiments thereof.

Figure 2:
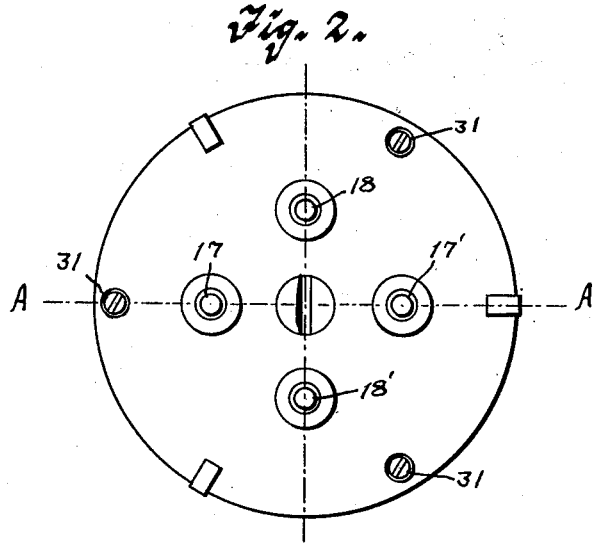

Referring to the drawings, Fig. 1 is an enlarged vertical sectional view of a thermostat comprising a quartz resonator in a chamber surrounded by a sealed vessel, the section being taken on the line A—A of Fig. 2; Fig. 2 is a bottom view of the thermostat shown in Fig. 1; Fig. 3 is an enlarged longitudinal sectional view showing mainly the quartz resonator and its supporting member, the section being taken in the rectangular direction with regard to Fig. 1; Fig. 4 is a partial sectional view of the thermostat along the line B—B of Fig. 3, and Fig. 5 is a vertical sectional view of a thermostat showing another embodiment of this invention.

Referring to Fig. 1, 1 represents a sealed vessel forming a chamber 2; 3 is an elastic bellows forming an upper part of the sealed vessel 1. Vaporizable liquid 4, such as methyl-alcohol, and its vapor are simultaneously enclosed in the vessel 1. The vessel is attached to a flange 5 of dielectric material and an electric heater 6 is wound on an electric insulation material 7 which surrounds the vessel 1. On the free end of the bellows 3 is fixed a piece 8 which can push up a resilient arm 9 to separate its contact point 10 from a cooperating contact point 11 which is attached to another arm 12. The arms 9 and 12 are fixed on an electric insulation disc 13 which is supported by threaded poles 14 soldered on the outer surface of the vessel 1. The height of the disc 13 can be adjusted by means of nuts 15 screwed in the threaded poles 14. 16 represents a base of dielectric material on which two pairs of plugs 17, 17' and 18, 18' are planted. One pair of plugs 17, 17' is connected across a source for the heater 6, when the plugs are inserted into a socket not shown. The electric circuit of the heater 6 includes one of the plugs which is represented by numeral 17, a resilient piece 19 which is attached to the root of the plug, a conductor 20 which is attached to the flange 5 and the lower part of which contacts with the free end of said resilient piece 19, a lead wire 21, the arm 12 and its fixed contact point 11, the movable contact point 10 and its resilient arm 9, a lead wire 21', the heater 6, another conductor 20', another resilient piece 19' and the other plug 17'.

Referring to Figs. 1 and 3, 22 is a quartz resonator which is placed between two conductor plates 23 and 23' with a desired pressure of a spring 24, and is held by a supporter 25 of electrical insulation material. This supporter forms a chamber into which heat insulation material 26, such as felt or fibre, is filled. The center leg 27 of the supporter is detachably secured to the base 16 by means of a screw 28. The electrodes 29 and 29' of the resonator 22 are connected to the other pair of plugs 18 and 18' through wires 30 and 30' respectively. These plugs are used for connecting the resonator 22 to any desired resonance circuit, when the plugs are inserted into the socket. The above described resonator 22 and its supporter 25 are adapted to be inserted, as a unit, into the chamber 2 formed by the vessel 1. At this insertion, the lower ends of the conductors 20 and 20' contact respectively and automatically with the free ends of the resilient pieces 19 and 19'. The flange 5 is fixed to the base 16 by means of screws 31. Thus the quartz resonator is surrounded perfectly by the vessel 1 and the heat insulation material 26 and isolated from the outer air. 32 is a cover or cap attached to the base 16.

The operation of the above described thermostat is as follows:

First, liquid medium, for example some quantity of methyl-alcohol, is poured into the thermostat vessel 1 through a hole 33. Next, the heater 6 is excited by a current passing therethrough. The boiling point of methyl-alcohol is 64.5° C. at 1 atmospheric pressure. Accordingly the liquid will begin to boil at this heating temperature and one part of which is changed to vapor which may exclude air formerly existing in the vessel and bellows through the hole 33. After the vessel is occupied by the vapor instead of air, the hole 33 is hermetically sealed and the heater current is cut off. Then the vapor in the vessel returns to liquid by cooling action of the outer air. At this condition, the bellows 3 will shrink to some extent, as it is corresponding to the outer temperature.

It is usual that quartz resonators for utilizing communication circuits are preferably maintained at the temperature of about 60° C. For this reason, the height of the insulation disc 13 is so adjusted and decided by nuts 15 as to just make contact the sharpened point of the piece 8 against the resilient arm 9 at the predetermined temperature.

Now, if the heater is excited to vaporize methyl-alcohol, the elastic bellows 3 is gradually elongated. At the moment when the inner temperature of the vessel 1 reaches to the predetermined value, say 60° C., the piece 8 will contact the resilient arm 9. But, as soon as the temperature raises a bit higher than 60° C., the bellows consequently elongates, which causes the piece 8 to lift the the arm 9 to separate the contact point 10 from the contact point 11, thereby cutting off the current passing through the heater. If a bit lower temperature than 60° C., on the contrary, occurs in the vessel, one part of the vapor in the vessel is condensed to liquid state. Hence, the volume of the vapor in the vessel is reduced, which also decreases the pressure in the vessel with the result that the bellows 3, with the piece 8, is shrunk to close the contact points 10 and 11 and the heater 6 is again energized.

In the above mentioned operation, the pressure depression in the vessel occurs promptly based upon a small temperature decrease, so that this invention has the advantage of preparing thermostats which are sensitive and positive in action. Moreover, the thermostats operate corresponding to the temperature change in the vessel, not in the chamber 2 which is surrounded by the former so that the quartz resonator 22 in the chamber can be maintained at precisely constant temperature.

In case of using a thermostat for a quartz resonator of a standard frequency oscillator or for that of a frequency oscillator which is installed in an aircraft, the bellows 3 is preferably protected from effect of atmospheric pressure change. For this purpose, the cover 32 is hermetically attached to the base 16 and the space formed between the cover 32 and the vessel 1 is maintained at the constant pressure, such as 1 atmospheric pressure. Thus operating error based upon the atmospheric pressure change can be avoided. It is, however, noticed that the error is always negligibly small in the usual practice.

Fig. 5 shows another embodiment of this invention in which a glass vessel 2' is used as the sealed vessel the upper part of which is provided with the bellows 3. That is, the bellows is communicated to the upper end of the glass vessel 2'. There are liquid 4 and its vapor in the glass vessel. The heater 6, in this case, is immersed into the liquid. In the glass vessel is enclosed a small vacuumed glass tube 34 having a quartz resonator 22 therein held on a supporter 35. The thermostat according to this example can also be adapted for a quartz resonator of a frequency ossillator used in an aircraft. In this example the glass vessel 2', bellows 3, the contact points 10 and 11 and their supporter are generally covered with a metal cap 36 which is attached to the base 16 by means of screws 37. A rubber packing 38 is inserted between the flange 39 of the cap 36 and the outer edge of the base 16 to isolate the inner space of the cap 36 from the outer air, thereby maintaining the inner space of the cap at a constant pressure in spite of the atmospheric pressure change. On the base 16 are mounted two pairs of plugs 17, 17' and 18, 18', one pair of plugs 17 and 17' being connected to the both ends of the electric heater 6 through the contact points 10 and 11 and the other pair of plugs 18 and 18' being connected across the both terminals of the quartz resonator 22 through the supporter 35. Thus the plugs can be put to a socket.

The other construction and operation of this example are respectively analogous to those explained in connection with the former example shown in Figs. 1 to 4, so that throughout these figures the same reference characters are used to designate similar parts and further explanation is omitted for the sake of simplicity.

The object to be maintained at desired temperature is not limited to a quartz resonator but, if desired, any other article, material or electrical element can also be inserted into the chamber 2 or the glass tube 34.

It is to be understood that this invention is not limited to any specific construction disclosed herein, or otherwise than by the appended claims.

What is claimed is:

1. A thermostat comprising in combination a sealed vessel having liquid and vapor thereof simultaneously enclosed therein and forming a constant temperature chamber surrounded by the vessel proper, an elastic bellows forming a part of said sealed vessel, a pair of contact points controlled by said elastic bellows, an electric heater for heating said liquid by a current passing through said contact points, and an element mounted in said constant temperature chamber to maintain it at a constant temperature.

2. A thermostat comprising in combination a sealed vessel having liquid and its vapor simultaneously enclosed therein and forming a constant temperature chamber surrounded by the vessel proper, an elastic bellows forming an upper part of said enclosed vessel, a pair of contact points controlled by said elastic bellows, an electric heater for heating said liquid by a current passing through said contact points and an electrical element inserted into said constant temperature chamber.

3. A thermostat comprising in combination a sealed vessel having liquid and its vapor simultaneously enclosed therein and forming a constant temperature chamber surrounded by the vessel proper, an elastic bellows forming an upper part of said enclosed vessel, a pair of contact points controlled by said elastic bellows, an electric heater for heating said liquid by a current passing through said contact points, a quartz resonator and a supporter thereof for detachably inserting said quartz resonator into said constant temperature chamber.

4. A thermostat comprising in combination a sealed vessel having liquid and its vapor simultaneously enclosed therein and forming a constant temperature chamber surrounded by the vessel proper, an elastic bellows forming an upper part of said enclosed vessel, a pair of contact points controlled by said elastic bellows, means for adjusting the height of said contact points with respect to the free end of said elastic bellows, an electric heater for heating said liquid by a current passing through said contact points, a quartz resonator, a supporter which is detachably secured, by means of a screw, to the base to which sealed vessel is attached for detachably inserting said quartz resonator into said constant temperature chamber and two pairs of plugs which are planted to said base, one pair of plugs being connected across said electric heater and the other being connected across the terminals of said quartz resonator.

5. A thermostat comprising in combination a glass vessel having liquid and vapor thereof simultaneously enclosed therein, an elastic bellows communicated to said glass vessel and forming a part thereof, a pair of contact points controlled by said elastic bellows, an electric heater immersed into said liquid in said glass vessel for heating said liquid by a current passing through said contact points, a vacuumed glass tube enclosed in said glass vessel and an electrical element enclosed in said vacuumed glass tube.

6. A thermostat comprising in combination a glass vessel having liquid and vapor thereof simultaneously enclosed therein, an elastic bellows communicated to said glass vessel and forming a part thereof, a pair of contact points controlled by said elatsic bellows, an electric heater immersed into said liquid in said glass vessel for heating said liquid by a current passing through said contact points, a vacuumed glass tube enclosed in said glass vessel and a quartz resonator enclosed in said vacuumed glass tube.

7. A thermostat comprising in combination a glass vessel having liquid and vapor thereof simultaneously enclosed therein, an elastic bellows communicated to said glass vessel and forming a part thereof, a pair of contact points controlled by said elastic bellows, an electric heater immersed into said liquid in said glass vessel for heating said liquid by a current passing through said contact points, a vacuumed glass tube enclosed in said vessel, a quartz resonator enclosed in said vacuumed glass tube and a cap for enclosing said glass vessel, said elastic bellows, said contact points and their supporter in a space of a constant pressure so as not to be affected by the atmospheric pressure change.

8. A thermostat comprising in combination a glass vessel having liquid and vapor thereof simultaneously enclosed therein, and elastic bellows communicated to said glass vessel and forming a part thereof, an electric heater immersed into said liquid in said glass vessel for heating said liquid by a current passing through said contact point, a vacuumed glass tube enclosed in said glass vessel, a quartz resonator enclosed in said vacuumed glass tube, a cap for enclosing said glass vessel, said elastic bellows, said contact points and their supporter in a space of a constant pressure so as not to be affected by the atmospheric pressure change, a pair of plugs which are planted on the base of said glass vessel and connected to the both ends of said electric heater through said contact points and another pair of plugs which are planted on the base of said glass vessel and connected across the both terminals of said quartz resonator.

References Cited in the file of this patent

UNITED STATES PATENTS

| Number | Name | Date |
| --- | --- | --- |
| 1,684,472 | Cathcart | Sept. 18, 1928 |